O. M. MÜLLER.
MINER'S LAMP.
APPLICATION FILED JULY 30, 1908.

935,219.

Patented Sept. 28, 1909.
2 SHEETS—SHEET 1.

Witnesses:
Arthur E. Gampfe.
August Miller

Inventor:
Otto Max Müller,
By Frank K. Friesen Atty.

O. M. MÜLLER.
MINER'S LAMP.
APPLICATION FILED JULY 30, 1908.

935,219.

Patented Sept. 28, 1909.
2 SHEETS—SHEET 2.

Witnesses:

Inventor:
Otto Max Müller, ms# UNITED STATES PATENT OFFICE.

OTTO MAX MÜLLER, OF GELSENKIRCHEN, GERMANY.

MINER'S LAMP.

935,219.

Specification of Letters Patent.   Patented Sept. 28, 1909.

Application filed July 30, 1908. Serial No. 446,047.

*To all whom it may concern:*

Be it known that I, OTTO MAX MÜLLER, a subject of the German Emperor, residing at Gelsenkirchen, in Germany, have invented certain new and useful Improvements in Miners' Lamps, of which the following is a specification.

The sensitiveness of incandescent bodies, and the complicated nature of the vaporizers required for portable lamps using incandescent bodies, have hitherto prevented the production of a practicable, convenient and economical incandescent miner's lamp.

The present invention relates to a miner's lamp with incandescent burner, and its object is to secure for mining work the important advantages possessed by incandescent lighting, more particularly the advantage of increased safety in the presence of fire-damp. This increased safety arises from the fact that if the flame is properly adjusted no burning gases pass out of the incandescent mantle. If inflammable gases are present and approach the burner, the vapor supply can be so throttled that there is no risk of overheating the wire netting, the adjustment for this purpose being, moreover, that which secures the most efficient illumination. The important advantage of security in the presence of fire-damp outweighs whatever disadvantages there may be with regard to lack of simplicity and economy.

A construction embodying the invention will now be described with reference to the accompanying drawing, in which—

Figure 1:
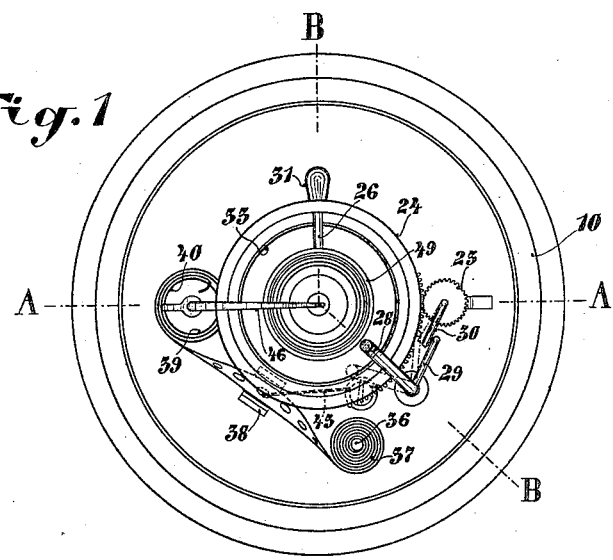
Figure 2:
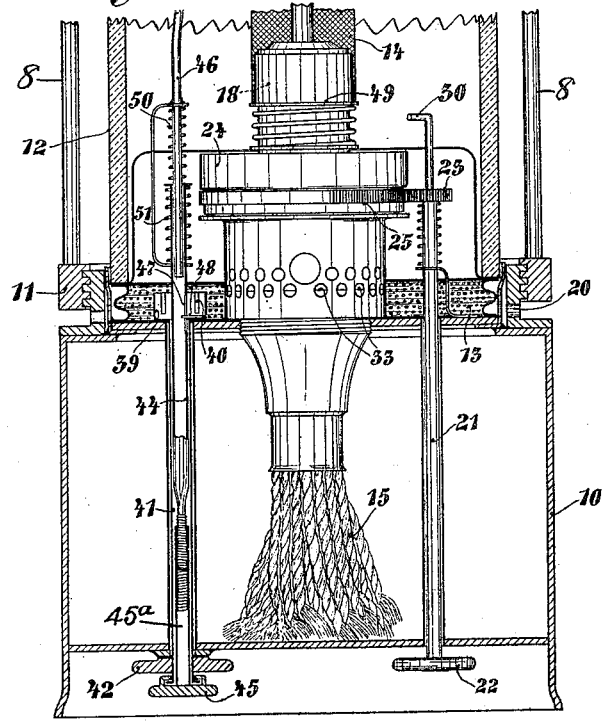
Figure 3:
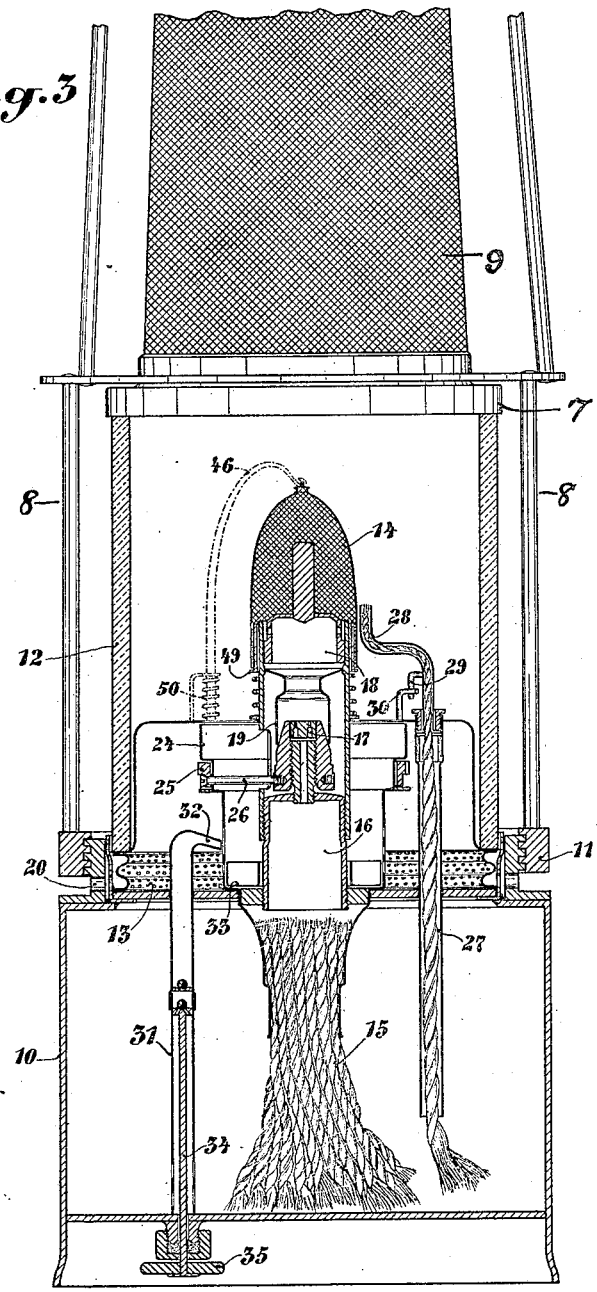

Figure 1 is a plan view, with the top of the lamp screwed off, Fig. 2 a cross-section on the line A—A of Fig. 1, and Fig. 3 a cross-section on the line B—B.

The chimney 12 is supported on the reservoir 10 by the screw-ring 11 bearing on the spring-ring 13. Chimney 12 is maintained in position by an upper ring 7 mounted on posts 8, the ring forming also the support for a wire protector 9. Within the chimney is suspended the incandescent mantle 14. The benzin, paraffin, spirit or other liquid fuel in the reservoir 10 is raised by a wick 15 and vaporized owing to the conduction of heat through the wick tube, the gases thus formed filling a chamber 16 above said tube. When the lamp is burning normally the vaporized fuel passes through the valve 17 to the burner 18 and becomes mixed with air entering through the holes 19. The combustible mixture passes out of the burner to the mantle 14. The air for combustion enters the lamp through holes 20 under the screw-ring 11, whence it flows into the chimney 12 and thence to the burner as described. For regulating the vaporization the spindle 21 traversing the reservoir is rotated by means of the wheel 22. The pinion 23 fixed to the spindle rotates the ring 25 mounted in the crown 24, and the said ring opens or closes the valve 17 by means of the pin 26, according to the direction of rotation.

To allow of testing for fire-damp (for which purpose a small naked flame is necessary) the lamp is provided with a small wick-burner 27 comprising an angular or bent tube 28 which is rotatable by means of an abutment 29 and lever 30 fixed to the spindle 21, the arrangement being such that when the incandescent burner is " off " the tube 28 is directed toward the incandescent mantle, and that when the incandescent burner is full " on " the tube is directed away from the mantle.

For lighting the lamp and bringing it into normal working condition fuel is pumped from the reservoir by means of the pump 31 and flows through the pipe 32 to the dish 33. The fuel in the latter is ignited to heat the vaporizer chamber and start the vaporization. For operating the pump the rod 34 is reciprocated by means of the button 35. The dish 33 preferably contains absorbent material such as cotton-wool, clay, or the like, to prevent spilling of the fuel. The liquid in the dish can be ignited by means of any suitable igniter commonly employed for lighting miners' lamps. In the drawing a known type of frictional device with paper strips is illustrated. The igniting strip 37 is placed on the pin 36 fixed to the cover of the reservoir, and passes over the support 38 to the feed device 39. The free end of the strip enters one of the slots 40. When the feed device 39 is rotated by means of the spindle 41 and disk 42 the strap is pulled, and the spring 43 bearing on the support 38 causes the inflammable mass pulled past it to become ignited. The flame enters the crown 24 and ignites the fuel in the dish 33.

In order to raise or lower mantle 14, the latter is suspended from a yoke 46 telescoped by a vertically adjustable tube 44. The latter is slidably mounted within a tubular spindle 41 and is threaded at its reduced lower end for the engagement with a correspondingly threaded sleeve 45ᵃ, extending upwardly from a regulating button 45 which is arranged below disk 42. A rotation of tube 44 is prevented by a pin 48 engaging a longitudinal slot 47 thereof. The vertical adjustability of yoke 46 is important in case the mantle breaks off near the top and slides down till it rests on the ring 49. In that case the yoke, with the upper part of the mantle, can be lowered until the two parts of the mantle are in contact again and the lamp can continue in use for the time being. To reduce risk of injury to a minimum the mantle is elastically supported by means of springs 50 and 51 within tube 44.

It is obvious that the invention is not restricted to the particular form of construction here illustrated and described. Many modifications can be made without departing from the principle of the invention.

What I claim as my invention and desire to secure by Letters Patent of the United States is:—

1. A miner's lamp comprising a fuel reservoir, a transparent chimney mounted thereon, a wire protector on the chimney, a burner carried by the reservoir and inclosed within the chimney, an incandescent mantle suspended above said burner, and a movably mounted fire-damp testing burner adapted to be swung into proximity to the mantle.

2. A miner's lamp comprising a fuel reservoir, a transparent chimney mounted thereon, a wire protector on the chimney, a wick tube within the reservoir, a valve-controlled main burner carried by the reservoir and communicating with the wick tube, an incandescent mantle suspended above said burner, and a fire-damp testing burner arranged in proximity to the mantle.

3. A miner's lamp comprising a fuel reservoir, a transparent chimney mounted thereon, a wire protector on the chimney, a wick tube within the reservoir, a valve-controlled main burner carried by the reservoir and communicating with the wick tube, an incandescent mantle suspended above said burner, and a movable fire-damp testing burner mounted on said reservoir and operatively connected to the burner valve.

4. A miner's lamp comprising a fuel reservoir, a transparent chimney mounted thereon, a wire protector on the chimney, a wick tube within the reservoir, a valve-controlled main burner carried by the reservoir and communicating with the wick tube, a yoke adjustably secured to the reservoir, an incandescent mantle suspended from the yoke above the burner, and a bent rotatable fire-damp testing burner operatively connected with the main burner valve.

5. A miner's lamp comprising a fuel reservoir, a transparent chimney mounted thereon, a wire protector on the chimney, a wick tube within the reservoir, a valve-controlled main burner carried by the reservoir and communicating with the wick tube, an incandescent mantle suspended above said burner, a movable fire-damp testing burner operatively connected with the main burner valve, an auxiliary burner below the main burner, and a pump for conveying fuel from the reservoir to said auxiliary burner.

6. A miner's lamp comprising in combination with a vapor burner an incandescent body, a fuel reservoir, a transparent chimney, a wire protector, a fuel vaporizer, a wick-burner, means for regulating the supply of vaporized fuel to the vapor burner, and means for adjusting the wick-burner so that it is directed toward or away from the incandescent body, said regulating and adjusting means being so related that when the vapor-supply to the vapor burner is cut off the wick-burner is directed toward the incandescent body and that when the vapor supply is full on the wick-burner is oppositely directed.

Signed by me at Barmen, Germany, this 17 day of July 1908.

OTTO MAX MÜLLER.

Witnesses:
OTTO KÖNIG,
WM. WASHINGTON BRUNSWICK.